US009721295B1

(12) United States Patent
Miller et al.

(10) Patent No.: US 9,721,295 B1
(45) Date of Patent: Aug. 1, 2017

(54) FORECASTING SUPPLY CHAIN COMPONENTS

(75) Inventors: Kevin C. Miller, Herndon, VA (US); Jeffrey S. Eakle, Bainbridge Island, WA (US); Steven S. Armato, Seattle, WA (US); Jonathan B. Norwood, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 923 days.

(21) Appl. No.: 13/430,231

(22) Filed: Mar. 26, 2012

(51) Int. Cl.
*G06Q 40/00* (2012.01)
*G06Q 40/02* (2012.01)

(52) U.S. Cl.
CPC .................................. *G06Q 40/02* (2013.01)

(58) Field of Classification Search
None
See application file for complete search history.

(56) References Cited

U.S. PATENT DOCUMENTS

| RE45,371 E | 2/2015 | Simons |
| 2002/0013731 A1 | 1/2002 | Bright et al. |
| 2002/0019761 A1 | 2/2002 | Lidow |
| 2002/0022985 A1 | 2/2002 | Guidice et al. |
| 2002/0138358 A1 | 9/2002 | Scheer |
| 2002/0143598 A1 | 10/2002 | Scheer |
| 2002/0161674 A1 | 10/2002 | Scheer |
| 2002/0174000 A1 | 11/2002 | Katz et al. |
| 2003/0088450 A1 | 5/2003 | Chiu et al. |
| 2003/0110104 A1 | 6/2003 | King et al. |
| 2006/0064344 A1 | 3/2006 | Lidow |
| 2008/0312978 A1 | 12/2008 | Binney et al. |
| 2010/0070337 A1 | 3/2010 | Poth et al. |
| 2010/0138310 A1 | 6/2010 | Coleman et al. |
| 2010/0153945 A1 * | 6/2010 | Bansal et al. ..................... 718/1 |
| 2011/0246322 A1 | 10/2011 | Wulteputte et al. |
| 2011/0251865 A1 | 10/2011 | Yuen et al. |
| 2013/0046708 A1 * | 2/2013 | Griep et al. .................. 705/348 |

* cited by examiner

*Primary Examiner* — Shay S Glass
(74) *Attorney, Agent, or Firm* — Thomas|Horstemeyer, LLP

(57) ABSTRACT

Disclosed are various embodiments for generating an interface for communication of at least one supply chain associated with an order that comprises forecast completion times for components of the at least one supply chain. The interface includes nodes that are associated with components of the at least one supply chain. The nodes within the interface are linked, wherein each link connects two of the nodes and indicates a relationship between the corresponding components of the at least one supply chain. The nodes and the links are arranged into a rooted tree within the interface, wherein the rooted tree represents the organization of the components of the at least one supply chain.

22 Claims, 5 Drawing Sheets

FORECASTING SUPPLY CHAIN COMPONENTS

BACKGROUND

Merchants may rely upon supply chains to deliver products to customers. Customers who order products from merchants may have no insight into the supply chains used. Without this insight, customers may be unaware of problems along the supply chains for the products until the products fail to arrive on time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments facilitating generation of an interface to communicate the status of one or more supply chains associated with an order of an item from an electronic commerce system. The interface includes various nodes representing components of the supply chain such as, for example, manufacturing, assembly, transportation, and/or other supply chain components. Each of the nodes of the supply chain are linked to at least one other node forming a rooted tree, wherein the root of the tree is the final product of the supply chain and the branches form a temporal sequence of components of the final product. The node and links within the interface may be modified based upon the forecast status of the respective components of the order. For example, a component with a forecasted delivery time later than the proposed delivery time may be displayed using a red color to indicate the likelihood that the component will not be available as proposed. In the following discussion, a general description of the system and its components is provided, followed by a discussion of the operation of the same.

Figure 1:
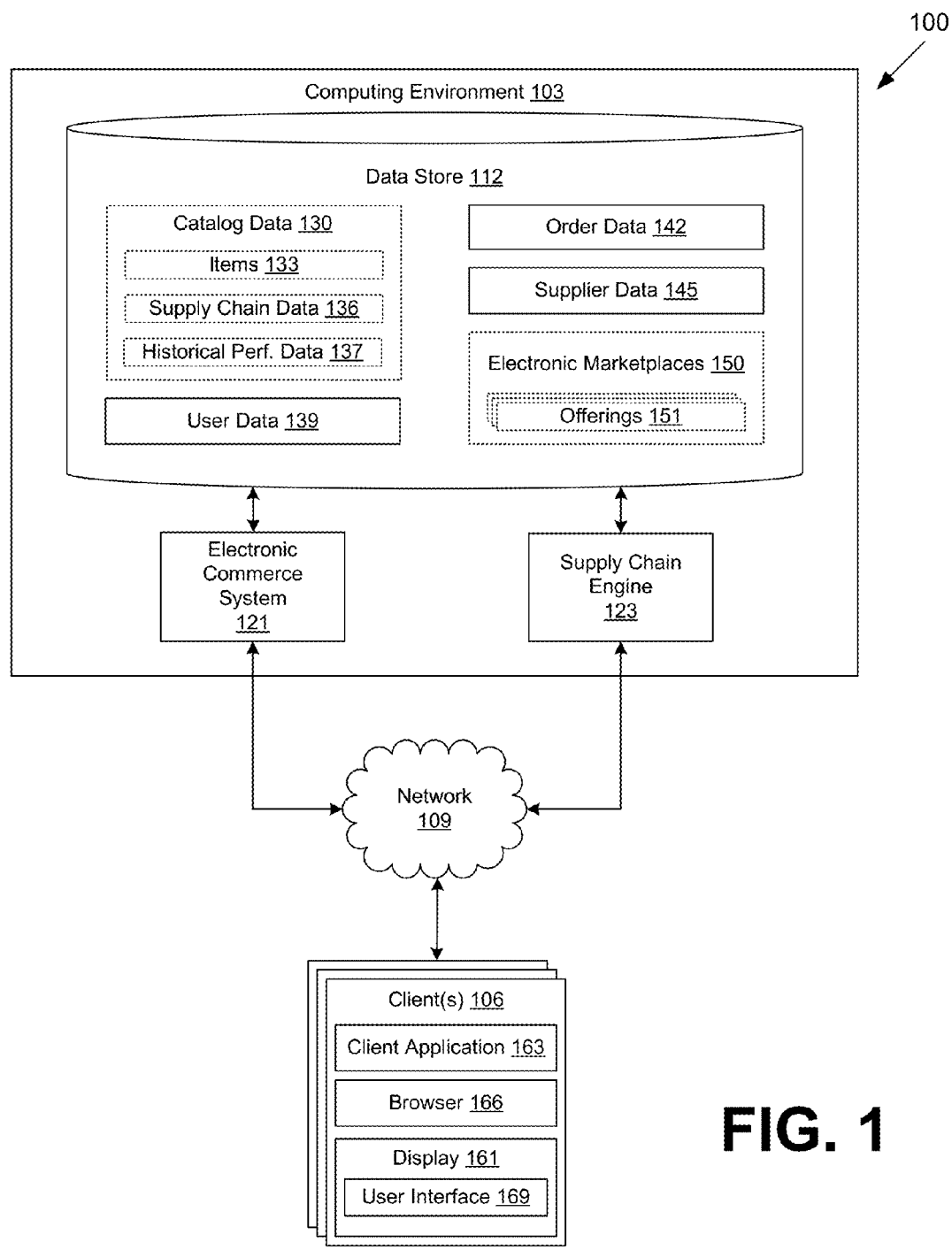
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an electronic commerce system 121, a supply chain engine 123, and other applications, services, processes, systems, engines, or functionality not discussed in detail herein. The electronic commerce system 121 is executed in order to facilitate the online purchase of items from one or more electronic marketplaces over the network 109. The electronic commerce system 121 also performs various backend functions associated with the online presence of an electronic marketplace in order to facilitate the online purchase of items. For example, the electronic commerce system 121 generates content pages such as, for example, web pages and/or other types of network content that are provided to clients 106 for the purposes of promoting and selecting items for purchase, rental, download, lease, or any other forms of consumption.

The supply chain engine 123 is executed to facilitate generation of an interface to communicate the status of one or more supply chains associated with an order from an electronic commerce system. To generate the interface, the supply chain engine 123 may employ supply chain data, order data, user data, and/or other data from the data store 112. The interface may be employed to render a display on a client 106 over the network 109 by a browser, a client application, and/or other application. In some embodiments, the supply chain engine 123 may support creation and modification of supply chains by users. The data defining the supply chains may be input by a client 106 over the network 109 by a browser, a client application, and/or other application.

The data stored in the data store 112 includes, for example, catalog data 130, user data 139, order data 142, supplier data 145, electronic marketplaces 150, and potentially other data. The catalog data 130 may include items 133, which are offered in the electronic marketplaces 150, as well as supply chain data 136, historical performance data 137, and other information associated with the items 133. The various data stored in catalog data 130 may include, for example, titles, descriptions, classifications, quantities, conditions, images, options, weights, customer reviews, customer ratings, keywords, prices, promotions, shipping configuration, tax configuration, unique identifiers, and any other data related to items 133 and/or supply chain data 136.

An item 133 may refer to a product, good, service, software download, multimedia download, supply chain, or any combination, bundle, or package thereof that may be offered for sale, purchase, rental, lease, download, and/or any other form of consumption and/or acquisition as may be appreciated. An item 133 may further be associated with one or more supply chains. The supply chain data 136 includes various data associated with a supply chain for an item 133 such as, for example, components, raw materials, relationship among the components, location of production, length of time for production, production capacity, specifications of the product, delivery methods/restrictions, identifier for the supply chain, and/or other data related to the supply chain as can be appreciated.

In some embodiments, the supply chain data 136 may further include authorization data associated with each supply chain that includes permissions and/or restrictions for use of portions of the supply chain. As a non-limiting example, a merchant may create a supply chain for an item 133 with full details of each step of the supply chain. While the merchant may make the item 133 and the associated supply chain available for use by others, the merchant may choose to generalize or restrict access to some of the details of the supply chain for competitive reasons and/or other reasons. The historical performance data 137 includes data related to completion of components of supply chains. The historical performance data 137 may include statistics relating to component failures, returns, satisfaction, completion time, and/or other metrics associated with the historical performance of components and the respective suppliers used in supply chains.

The user data 139 includes various data related to the users of the electronic commerce system 121 and supply chain engine 123, such as, for example, authentication data, authorization data, preferences, billing information, shipping information, and/or other data. In some embodiments, the authorization data may include ownership, access control lists (ACLs) and/or various other permissions associated with the supply chain data 136.

The order data 142 may include various data relating to orders placed through the electronic commerce system 121. Such data may include order identifiers, item identifiers, supply chain identifiers, selected options, quantities, shipping methods, payment status, destination address(es), order status, item status, supply chain component status, and so on. The supplier data 145 includes data relating to suppliers of items 133 and components of the supply chains.

Each electronic marketplace 150 may correspond to a distinct network site that targets various customers in the form of a storefront that offers items 133 for sale by a merchant. Each electronic marketplace 150 is surfaced to customers through the electronic commerce system 121 and may be associated with various data such as, for example, offerings 151, metadata, and/or other data. The offerings 151 relate to items 133 in the catalog data 130 that are specifically offered by a merchant within an electronic marketplace 150.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may include a display 161. The display 161 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a client application 163, a browser 166, and/or other applications. The client application 163 may be executed in a client 106, for example, to access and render data from the electronic commerce system 121, supply chain engine 123, and/or other services of the computing environment 103, thereby rendering a user-interface 169 on the display 161. The browser 166 may be executed in a client 106, for example, to access and render network pages, such as web pages, or other network content served up by the computing environment 103 and/or other servers, thereby rendering a user-interface 169 on the display 161. Regardless of the application used, the user-interface 169 may be implemented using a graphical user-interface (GUI), a command-line interface (CLI), and/or other type of user-interface as can be appreciated. The client 106 may be configured to execute applications beyond the client application 163 and the browser 166 such as, for example, email applications, instant message applications, and/or other applications.

Next, a general description of the operation of the various components of the networked environment 100 is provided. For various reasons, a user may wish to visualize the forecast and/or the current activity of one or more supply chains associated with an item 133 from an order. The visualization may allow the user to, for example, confirm each component of an item 133 is expected to progress to completion on-schedule, estimate how far a component is likely to be behind schedule, observe how many steps remain before delivery of the item 133, and/or other data related to the supply chain.

To begin, a merchant may define a supply chain within the supply chain data 136. The supply chain comprises a representation of the components of a finished product and the steps needed to assemble those components into the finished product. In some embodiments, the steps of a supply chain may depend upon a price associated with one or more components of the supply chain. The supply chain may be described in varying degrees of detail, but may include, for example, input materials, location of production, proposed completion time for production, production capacity, specifications of the product, delivery methods/restrictions, identifier for the supply chain, and/or other data as can be appreciated.

Once a supply chain is defined, the finished product of the supply chain may be made available as an item 133. Merchants may choose to permit others to view some or all of the detail of a supply chain associated with an item 133, or the merchant may choose to restrict all information associated with the supply chain. In some embodiments, a merchant may assign permissions for the supply chain to select users and/or groups that control visibility of portions and details of the supply chain.

The components of a supply chain may be other items 133 that may or may not have an associated supply chain. The items 133 used as components may be defined by the merchant using the supplier data 145 and/or the items 133 may be created by other merchants. As a non-limiting example, a merchant may offer a supply chain for a headlight that includes a lens and a bulb, while the bulb may also have an associated supply chain offered by another merchant that includes an enclosure and a filament.

A portion of the items 133 may be available as offerings 151 through various electronic marketplaces 150 surfaced by the electronic commerce system 121. Orders for items 133 placed through the electronic commerce system 121 may be stored in the order data 142. The order status of the items 133 and the components of the associated supply chains may be updated by the merchant and/or through various other means such as, for example, electronic data interchange (EDI).

The order status and other data related to completion of components of supply chains may be collected in the historical performance data 137. The historical performance data 137 may include data and statistics relating to component failures, returns, satisfaction, completion time, delivery time, and/or other metrics associated with the historical performance of items 133, components, and the respective suppliers used in supply chains.

The supply chain engine 123 may perform a statistical analysis of the various data associated with completion of the component reported in the historical performance data 137. The statistical analysis may be used to calculate a forecast completion time for future orders of a given component based at least upon performance for prior orders of the component. Furthermore, a forecast completion time for a given component may be generated for each potential supplier of the component, and the forecasts may be revised in near "real-time" based upon updates to the historical performance data 137. In some embodiments, the supply chain engine 123 may modify the proposed completion time of components of the supply chain to more closely reflect the forecast completion time.

In other embodiments, an inventory of a given component held in inventory by a supplier or another party may diminish the statistical weight given to previous delayed completion rates for the component when calculating the forecast completion time. As a non-limiting example, if a component typically takes one day longer to produce than the time proposed to produce it, the additional one day of delay may be ignored if the component is already produced and stored in inventory.

Once an order for an item 133 is placed, the supplier(s) chosen for the components may be based upon various factors. As a non-limiting example, the supplier(s) may be chosen based upon proposed completion time, forecast completion time, a requirements contract with a given supplier, component cost, historical performance, and/or other factors as can be appreciated. Furthermore, a supplier may be chosen that offers a pre-finished component represented by one or more components of the supply chain. For example, a supply chain for a vehicle may contain a turn signal component, which is made-up of sub-components, such as a bulb, a lens, and a lamp socket. The supply chain may permit the merchant to order the sub-components to be assembled into a turn signal, or the merchant may simply order a pre-finished turn signal. The selection of ordering sub-components or a pre-finished component may be made based upon similar factors as used to determine a particular component supplier.

Upon request by a client 106, the supply chain engine 123 may generate a programmatic interface for communication of the supply chain(s) associated with an ordered item 133 within the client application 163, browser 166 and/or other application. The programmatic interface may include various nodes representing components of the supply chain such as, for example, manufacturing, assembly, transportation, and/or other supply chain components. Each of the nodes are linked to at least one other node eventually forming a tree, wherein the root of the tree is the final product of the supply chain and the branches form a temporal sequence of components of the final product. The communication of the nodes and links within the interface may be adapted based at least upon a differential between the proposed completion time and the forecast completion time, the status of the respective components of the order, the present inventory of components, and/or other possible states.

Figure 2:
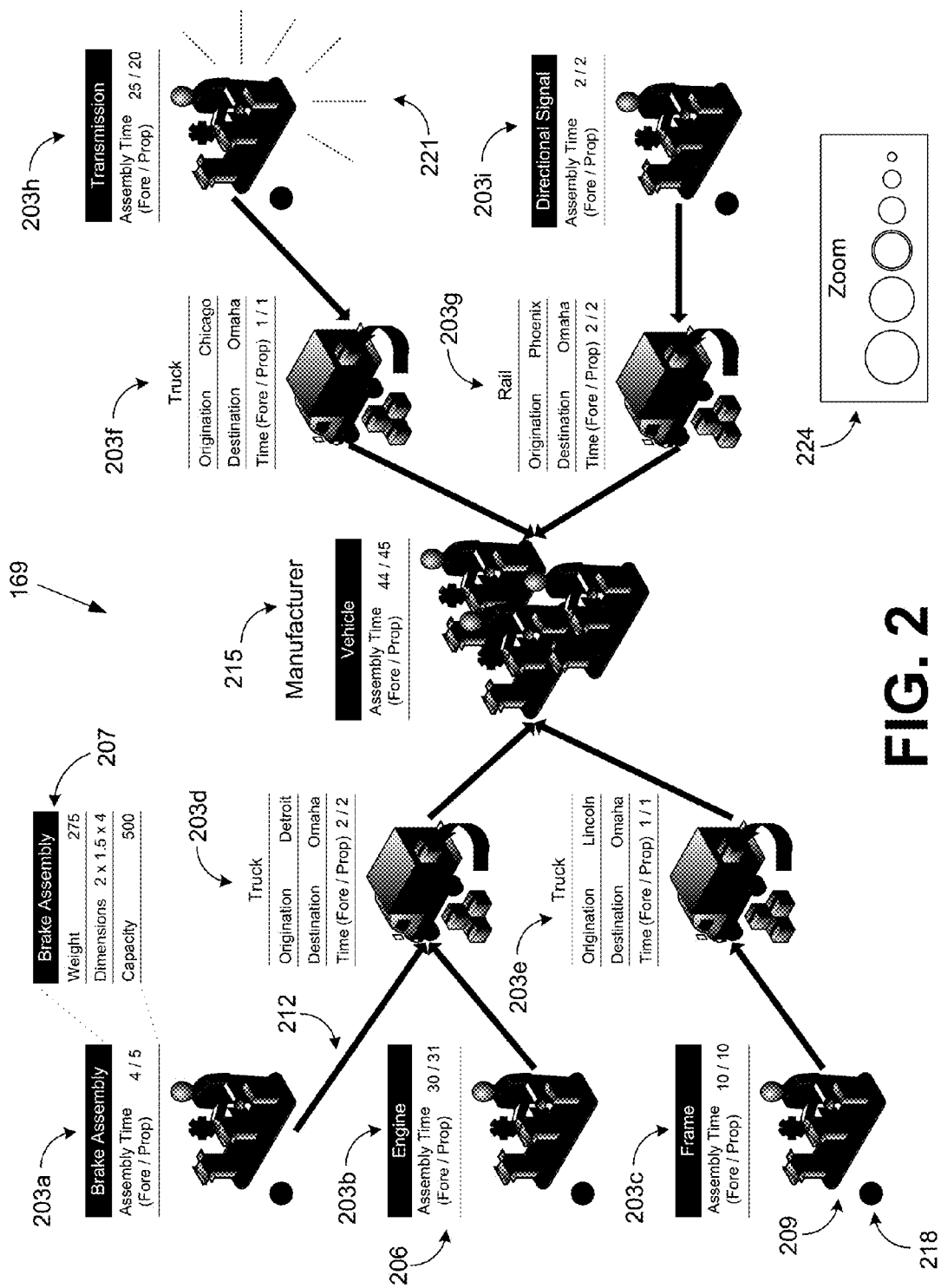
FIG. 2 is a drawing of an example of a user-interface rendered by a client in the networked environment of FIG. 1 according to various embodiments of the present disclosure.

Referring next to FIG. 2, shown is an example implementation of user-interface displaying the status of supply chain(s) associated with an order. To begin, the user-interface 169 shows the nodes 203*a-i* representing components of a supply chain. The nodes 203*a-i* may have an identifier corresponding to the name of the components and may include a default portion 206 of the supply chain data 136 (FIG. 1) associated with each of the nodes 203*a-i*. The default portion 206 of the data displayed for the nodes 203*a-i* may be dependent upon the type of the node, the status of the node, and/or other criteria. Furthermore, the default portion 206 of the data displayed may be customized within the client application 163 (FIG. 1), browser 166 (FIG. 1), and/or user data 139 (FIG. 1). As a non-limiting example, each node may be customized to display both the forecast and proposed completion times as shown in nodes 203*a-i*.

As a non-limiting example, the default portion 206 of all nodes 203*a-i* may be customized to display the forecast and/or proposed time to complete the component, while transportation nodes may further display the origination and destination of the shipment. In some embodiments, the user-interface 169 may be customized to show particular information for a node, and display additional information 207 about a node if requested by a user. The request may be in the form of input received from a mouse click, from hovering a pointer over the node, and/or other input methods.

Furthermore, icons 209 may be used by the nodes 203*a-i* to represent the different types of components. For example, an icon of a truck may be used to represent a transportation component, while an icon of an assembly line may be used to represent an assembled component. Next, links 212 may be used between each pair of nodes 203*a-i* to illustrate a temporal relationship and hierarchy among the nodes 203*a-i*. The various nodes 203*a-i* are collectively linked preserving the relationship and hierarchy among the nodes 203*a-i* to form a rooted tree, with the finished product of the supply chain being designated as the root node 215. In some embodiments, the user-interface 169 may permit the user to arrange the nodes 203*a-i* according to preference while still maintaining the organization of the supply chain(s).

Subsequently, an indicator of the tier 218 of each component within the supply chain may be used. The tier 218 may represent a distance between each component product and the finished product on the supply chain. Next, an alert 221 may be generated based at least upon the state of the corresponding component within the supply chain of the order. As a non-limiting example, if the component is forecast to take longer than proposed to complete, the node may flash, turn red, and/or provide some other method of notification. Continuing with this example, the link(s) between the node of the component forecast to be delayed and the finished product may also be affected by, for example, turning yellow to indicate a potential problem due to the forecast delay.

Thereafter, the user-interface 169 includes a zoom function 224 to support generating more generalized or more detailed views of the supply chain(s) associated with the order. Such a capability to adjust the level of detail of the various components in the supply chain(s) may be useful in a number of circumstances. As a non-limiting example, for a supply chain containing 10,000 nodes, a user may not wish to view full detail of the whole supply chain. Instead, the user may wish to see a generalized view of one or more nodes 203a-i, but still retain the ability to observe in detail any problem areas. A further example of this capability is discussed below.

Figure 3:
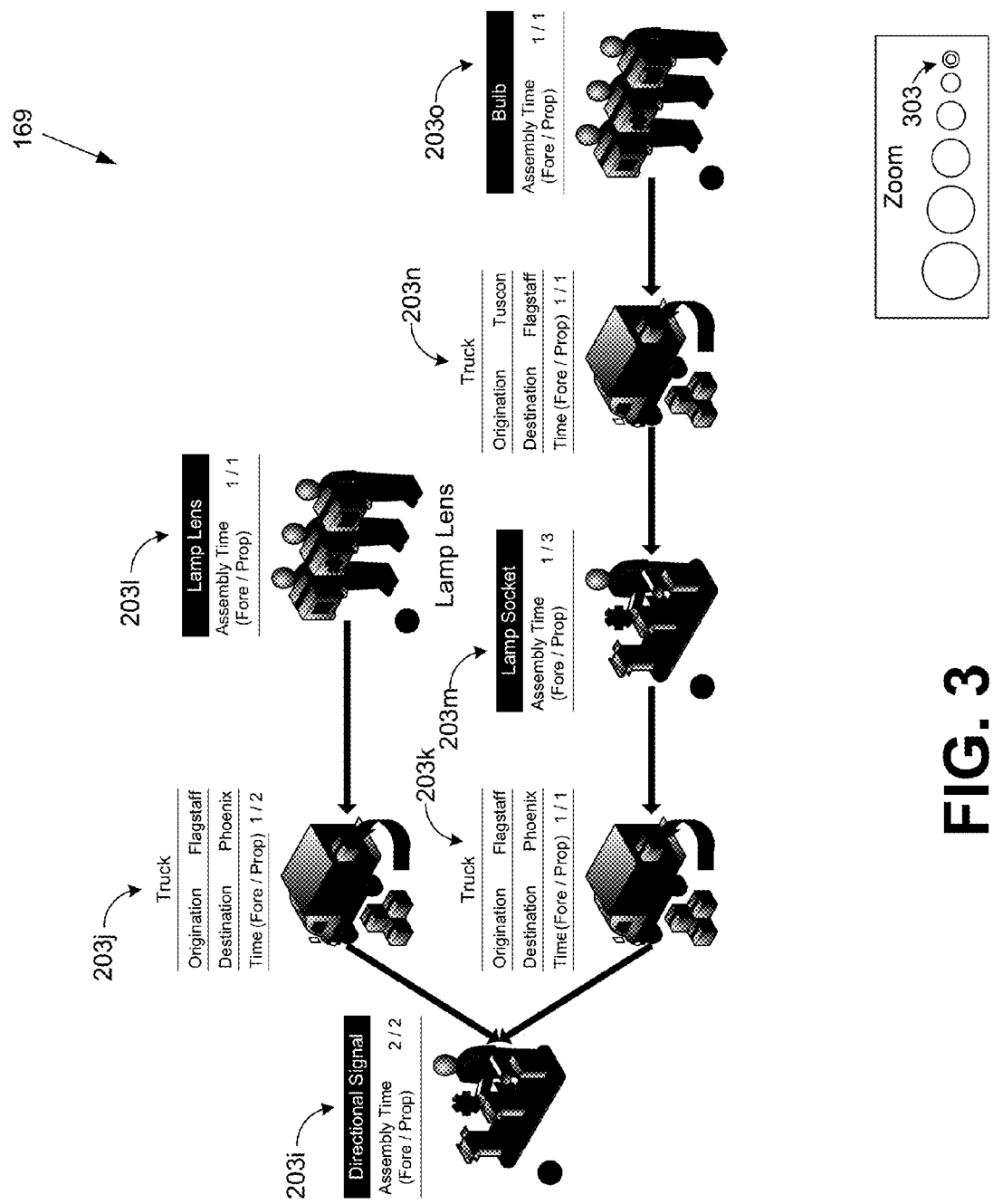
FIG. 3 is a drawing of an example of a user-interface rendered by a client in the networked environment of FIG. 1 according to various embodiments of the present disclosure.

Turning now to FIG. 3, shown is an example implementation of a user-interface 169 displaying a more detailed view of a portion of the supply chain(s) associated with an order. The components previously represented as a single node 203i are instead shown in greater detail as comprising multiple components, as exemplified by nodes 203i-o. As discussed previously, the ability to have a more abstract view of one or more portions of the supply chain may be useful when the supply chain is large, portions of the supply chain are not critical, and/or other possible reasons.

As a non-limiting example, a generalized view of the supply chain(s) associated with an ordered item may include only the "first-tier" components used at the final assembly step to produce the finished product. A detailed view of the supply chain(s) may include the addition of components for transportation, raw materials, lower-tier components, and/or other more specific components. Next, a zoom indicator 303 may be used to show the user the level of detail currently used to display the supply chain(s).

Figure 4:
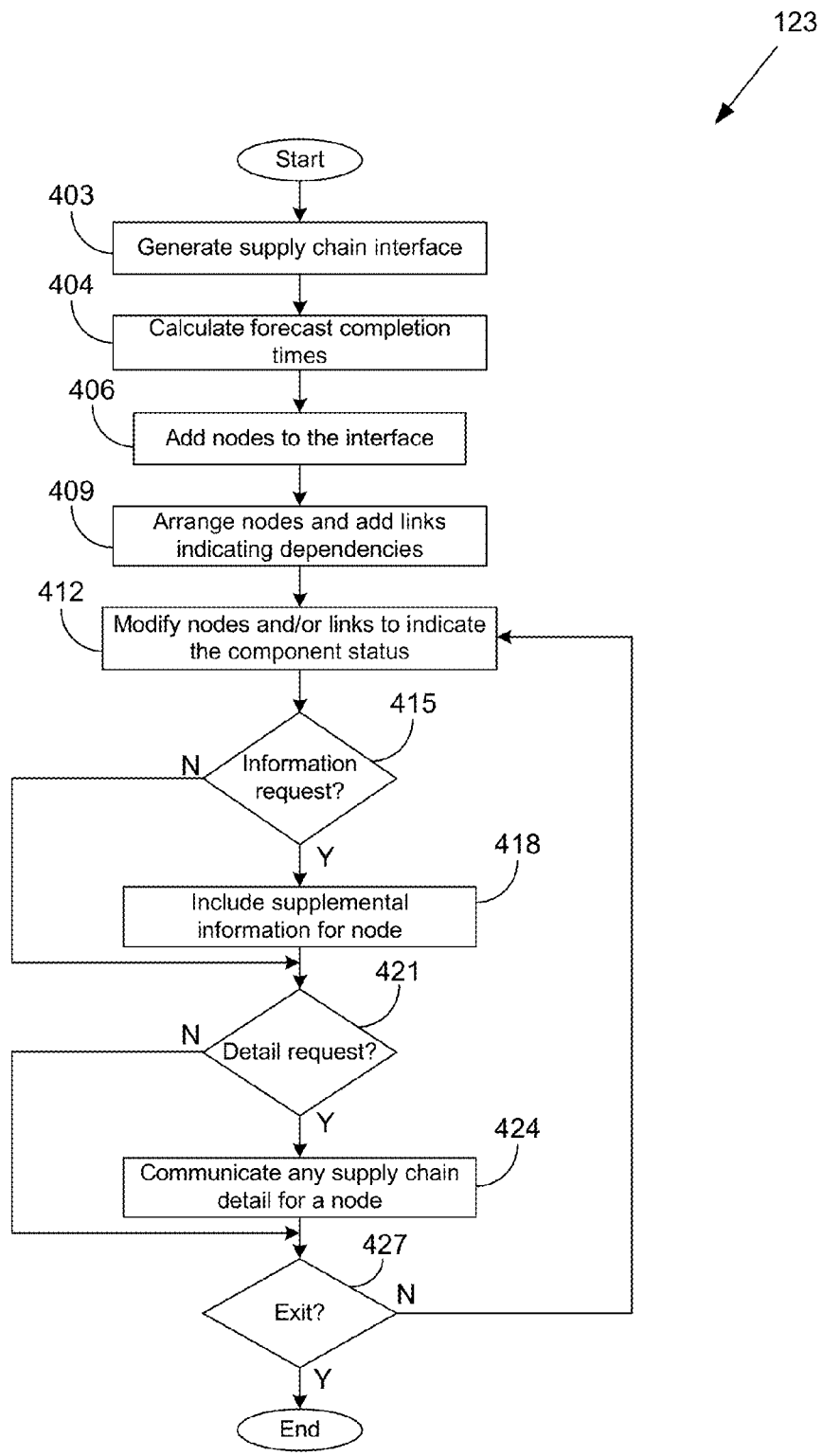
FIG. 4 is a flowchart illustrating examples of functionality implemented as portions of a supply chain engine executed in a computing environment in the networked environment of FIG. 1 according to various embodiments of the present disclosure.

Referring next to FIG. 4, shown is a flowchart that provides one example of the operation of a portion of the supply chain engine 123 according to various embodiments. It is understood that the flowchart of FIG. 4 provides merely an example of the many different types of functional arrangements that may be employed to implement the operation of the portion of the supply chain engine as described herein. As an alternative, the flowchart of FIG. 4 may be viewed as depicting an example of steps of a method implemented in the computing environment 103 (FIG. 1) according to one or more embodiments.

This portion of the supply chain engine 123 may be executed upon request from a client 106 (FIG. 1) to view the status of the supply chain(s) associated with an order for an item. Beginning in box 403, the supply chain engine 123 may initialize an interface to communicate the status of the supply chain(s) for an ordered item. The supply chain engine 123 may retrieve the status of the order, as well as the status of the components of the supply chain(s) associated with the order from the order data 142 (FIG. 1).

Then, in box 404, the supply chain engine calculates a forecast completion time for components of the supply chain(s) associated with the current order. To calculate the forecast completion time, the supply chain engine performs a statistical analysis of the historical performance data 137 (FIG. 1) associated with prior orders of the various components of the supply chain(s). Furthermore, a forecast completion time for a given component may be based upon the particular supplier used as the source for the component.

Next, in box 406, the supply chain engine 123 may add nodes representing the various components of the supply chain(s). Portions of the supply chain(s) including, for example, various components, information about the components, and/or other data, may be not be added to the interface based upon permissions for the supply chain. As discussed previously, permissions may be specified by the owner of the supply chain and may be based upon the identity of the merchant offering the item 133 (FIG. 1), the customer acquiring the item 133, and/or other criteria.

Then, in box 409, the supply chain engine 123 may arrange and link each of the nodes according to the arrangement of the corresponding components of the supply chain within the supply chain data 136 (FIG. 1). The result of the arrangement is a tree whose root is the final product of the supply chain and the branches form a temporal sequence of components of the final product. Next, in box 412, the supply chain engine 123 may modify the representations of the nodes and/or links to reflect the present status of the components of the ordered item 133. As a non-limiting example, if a component has taken longer than expected to complete, the icon may flash, turn red, and/or some other method of notification. Continuing with this example, the link(s) between the past due component and the finished product may also be modified by, for example, turning yellow to indicate a potential problem due to the past due component.

Subsequently, in box 415, the supply chain engine 123 determines whether input was obtained from the client 106 requesting additional information about a node. The additional information may be other data associated with, but not presently displayed for, one or more components of the supply chain(s) represented by the node. If no request for additional information was received, execution of the supply chain engine 123 proceeds to box 421.

Alternatively, if a request for additional information was received from the client 106, the additional information for the node may be displayed within the interface in box 418. As discussed previously, the information that may be displayed for a node and the associated component(s) may be limited at least by the permissions of the supply chain owner.

Next, in box 421, the supply chain engine 123 determines whether input was obtained from the client 106 requesting a change in the detail of the view of the supply chain(s). If no request for a change in the detail of the view was received, execution of the supply chain engine 123 proceeds to box 427. Alternatively, if a request for a change in the detail of the view was received, the supply chain engine 123 may modify the detail of the supply chain(s) shown within the interface in box 424. The change in detail may include the addition and/or removal of nodes used to represent the various components of the supply chain(s), an adjustment to the information displayed for each node, and/or other changes in detail as can be appreciated. As discussed previously, portions of the components of the supply chain, as well as information associated with the components may be restricted based on permissions assigned to the supply chain.

Thereafter, in box 427, the supply chain engine 123 determines whether input was received from the client 106 or another source requesting to exit this portion of the supply chain engine 123. If no such request was received, execution of the supply chain engine 123 returns to box 412. Alternatively, execution of this portion of the supply chain engine 123 ends as shown.

Figure 5:
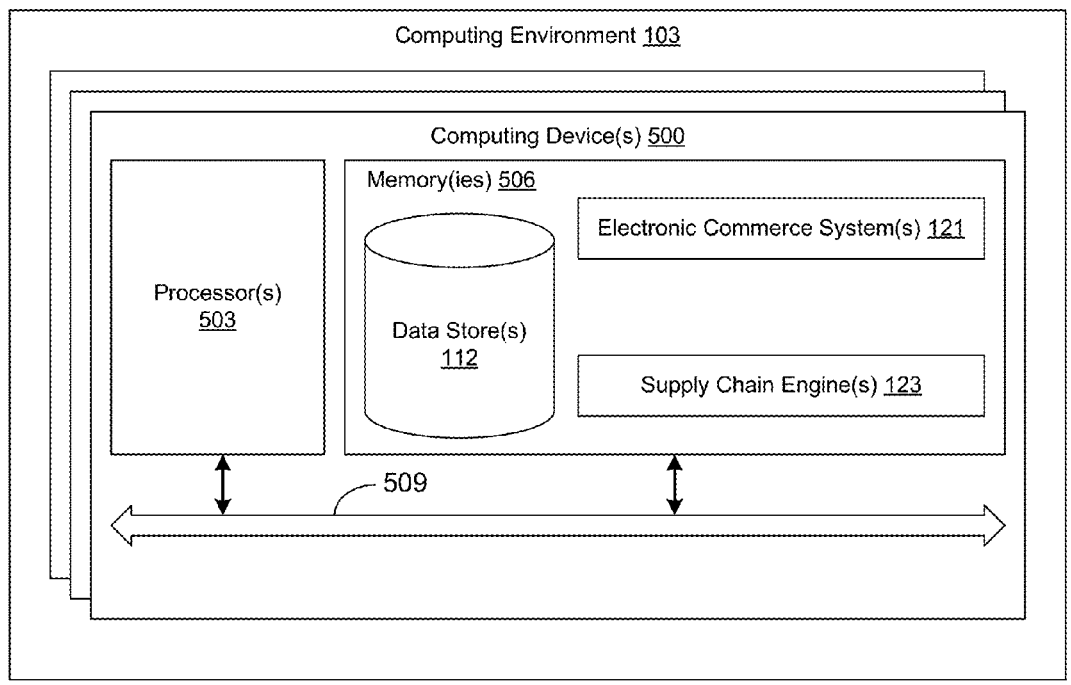
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 may comprise one or more computing devices 500. The computing device 500 includes at least one processor circuit, for example, having a processor 503 and a memory 506, all of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce system 121, supply chain engine 123, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 121, supply chain engine 123, client application 163, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the supply chain engine 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 121, supply chain engine 123, and client application 163, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to perform a method comprising:

obtaining, by the at least one computing device, order data that expresses an order for an item and comprises at least one supply chain identifier associated with the order;

obtaining, by the at least one computing device, supply chain data corresponding to the at least one supply chain identifier, wherein the supply chain data comprises an organization of a plurality of components of at least one supply chain and a proposed completion time for at least one of the components;

generating, by the at least one computing device, a forecast completion time for the at least one of the components of the at least one supply chain associated with the order of the item based at least upon historical completion time performance data on a plurality of prior orders associated with the at least one of the components;

encoding, by the at least one computing device, a graphical user-interface (GUI) for display via a network page of the at least one supply chain;

encoding, by the at least one computing device, a plurality of nodes within the GUI, wherein individual ones of the nodes are associated with a respective one of the components of the at least one supply chain and the individual ones of the nodes display the proposed completion time and the forecast completion time of the respective one of the components;

encoding, by the at least one computing device, a plurality of links within the GUI, wherein at least one of the links indicates a relationship between two of the nodes;

arranging, by the at least one computing device, the nodes and the links into a tree within the GUI, wherein the tree represents the organization of the components of the at least one supply chain; and adjusting, by the at least one computing device, the tree dynamically in the GUI to display a detailed view of the individual ones of the nodes in response to receiving data from a client device that indicates a location of a pointer on the GUI being near at least one of the nodes, the detailed view comprising additional components associated with the individual ones of the nodes, the additional components comprising at least one of a lower-tier component or a raw material component.

2. The non-transitory computer-readable medium of claim 1, wherein the order data comprises a plurality of supply chain identifiers.

3. The non-transitory computer-readable medium of claim 1, wherein the method further comprises modifying, by the at least one computing device, a color of the individual ones of the nodes corresponding to the components having the forecast completion time subsequent to the proposed completion time.

4. A system, comprising: at least one computing device; and a non-transitory computer-readable medium embodying a program executable in at least one computing device, wherein, when executed, the program causes the at least one computing device to perform a method comprising:

obtaining, by the at least one computing device, order data that expresses an order for an item and comprises at least one supply chain identifier associated with the order;

obtaining, by the at least one computing device, supply chain data corresponding to the at least one supply chain identifier, wherein the supply chain data comprises an organization of a plurality of components of at least one supply chain and a proposed completion time for at least one of the components;

generating, by the at least one computing device, a forecast completion time for the at least one of the components of the at least one supply chain associated with the order of the item based at least upon historical completion time performance data on a plurality of prior orders associated with the at least one of the components;

encoding, by the at least one computing device, a graphical user-interface (GUI) for display via a network page of the at least one supply chain;

encoding, by the at least one computing device, a plurality of nodes within the GUI, wherein individual ones of the nodes are associated with a respective one of the components of the at least one supply chain and the individual ones of the nodes display the proposed completion time and the forecast completion time of the respective one of the components;

encoding, by the at least one computing device, a plurality of links within the GUI, wherein at least one of the links indicates a relationship between two of the nodes;

arranging, by the at least one computing device, the nodes and the links into a tree within the GUI, wherein the tree represents the organization of the components of the at least one supply chain; and adjusting, by the at least one computing device, the tree dynamically in the GUI to display a detailed view of the individual ones of the nodes in response to receiving data from a client device that indicates a location of a pointer on the GUI being near at least one of the nodes, the detailed view comprising additional components associated with the individual ones of the nodes, the additional components comprising at least one of a lower-tier component or a raw material component.

5. The system of claim 4, wherein the attributes comprise the forecast completion time for the respective one of the components.

6. The system of claim 5, wherein the attributes further comprise a proposed completion time for the respective one of the components.

7. The system of claim 6, wherein individual ones of the nodes have assigned one of a plurality of indicators corresponding to a differential between the forecast completion time and the proposed completion time.

8. The system of claim 4, wherein the method further comprises:
responding, by the at least one computing device, to client device data requesting replacement of one of the components of the at least one supply chain with a substitute component based at least upon the client device data being received from the user interface; and
calculating, by the at least one computing device, a plurality of modifications to the forecast completion time for individual ones of the components of the at least one supply chain located subsequent to the substitute component.

9. The system of claim 4, wherein the historical completion time performance data further comprises a failure rate.

10. The system of claim 4, wherein the method further comprises:
responding, by the at least one computing device, to client device data obtained from the user interface requesting additional ones of the attributes of a selected one of the nodes; and
generating, by the at least one computing device, via the user interface, a remaining portion of the attributes of the selected one of the nodes.

11. The system of claim 4, wherein the method further comprises:
responding, by the at least one computing device, to client device data obtained from the user interface requesting a change in a level of detail of the at least one supply chain;
determining, by the at least one computing device, an adjustment to the nodes and the links, wherein the adjustment is based at least upon the change requested in the level of detail of the at least one supply chain; and
generating, by the at least one computing device, via the user interface, an update to the nodes and the links, wherein the update is based at least upon the adjustment.

12. The system of claim 4, wherein the method further comprises:
obtaining, by the at least one computing device, via the user interface, an actual completion time for a respective one of the components of the at least one supply chain associated with the order; and
storing, by the at least one computing device, an update to the historical completion time performance data based at least upon the actual completion time.

13. A method, comprising:
a non-transitory computer-readable medium embodying a program executable in at least one computing device, wherein, when executed, the program causes the at least one computing device to perform a method comprising:
obtaining, by the at least one computing device, order data that expresses an order for an item and comprises at least one supply chain identifier associated with the order;
obtaining, by the at least one computing device, supply chain data corresponding to the at least one supply chain identifier, wherein the supply chain data comprises an organization of a plurality of components of at least one supply chain and a proposed completion time for at least one of the components;
generating, by the at least one computing device, a forecast completion time for the at least one of the components of the at least one supply chain associated with the order of the item based at least upon historical completion time performance data on a plurality of prior orders associated with the at least one of the components;
encoding, by the at least one computing device, a graphical user-interface (GUI) for display via a network page of the at least one supply chain;
encoding, by the at least one computing device, a plurality of nodes within the GUI, wherein individual ones of the nodes are associated with a respective one of the components of the at least one supply chain and the individual ones of the nodes
display the proposed completion time and the forecast completion time of the respective one of the components;
encoding, by the at least one computing device, a plurality of links within the GUI, wherein at least one of the links indicates a relationship between two of the nodes;
arranging, by the at least one computing device, the nodes and the links into a tree within the GUI, wherein the tree represents the organization of the components of the at least one supply chain; and
adjusting, by the at least one computing device, the tree dynamically in the GUI to display a detailed view of the individual ones of the nodes in response to receiving data from a client device that indicates a location of a pointer on the GUI being near at least one of the nodes, the detailed view comprising additional components associated with the individual ones of the nodes, the additional components comprising at least one of a lower-tier component or a raw material component.

14. The method of claim 13, wherein the historical completion time performance data further comprises a late completion rate for the at least one of the components.

15. The method of claim 14, wherein an inventory of the at least one of the components reduces a statistical weight of the respective late completion rate used in calculating the respective forecast completion time.

16. The method of claim 13, further comprising: obtaining, via the user interface in the at least one computing device, input
requesting a change in a level of detail displayed of the at least one supply chain;
determining, in the at least one computing device, an adjustment to the nodes and the links, wherein the adjustment is based at least upon the change requested in the level of detail of the at least one supply chain; and
generating, in the at least one computing device, an update to the nodes and the links via the user interface, wherein the update is based at least upon the adjustment.

17. The method of claim 13, wherein individual ones of the nodes are associated with a proposed completion time.

18. The method of claim 17, wherein the proposed completion time is modified to approximate the forecast completion time.

19. The method of claim 17, wherein the individual ones of the nodes have assigned one of a plurality of indicators corresponding to a differential between the forecast completion time and the proposed completion time.

20. The method of claim 13, further comprising: obtaining, via the user interface in the at least one computing device, an
- actual completion time for a respective one of the components of the at least one supply chain associated with the order; and
- storing, in a memory accessible to the at least one computing device, an update to the historical completion time performance data based at least upon the actual completion time.

21. The method of claim 13, wherein the at least one supply chain is associated with a plurality of permissions, wherein the permissions restrict communication of a supplier name associated with a portion of the components.

22. The method of claim 13, further comprising responding, in the at least one computing device, to client device data requesting replacement of one of the components of the at least one supply chain with a substitute component.

\* \* \* \* \*